(12) United States Patent
Bala et al.

(10) Patent No.: US 11,983,394 B2
(45) Date of Patent: *May 14, 2024

(54) SYSTEM AND METHOD FOR GENERATING PHOTOREALISTIC SYNTHETIC IMAGES BASED ON SEMANTIC INFORMATION

(71) Applicant: Palo Alto Research Center Incorporated, Palo Alto, CA (US)

(72) Inventors: Raja Bala, Pittsford, NY (US); Sricharan Kallur Palli Kumar, Mountain View, CA (US); Matthew A. Shreve, Campbell, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,708

(22) Filed: Nov. 23, 2022

(65) Prior Publication Data

US 2023/0090801 A1    Mar. 23, 2023

Related U.S. Application Data

(63) Continuation of application No. 16/040,220, filed on Jul. 19, 2018, now Pat. No. 11,537,277.

(51) Int. Cl.
*G06F 3/04845* (2022.01)
*G06F 3/04847* (2022.01)
(Continued)

(52) U.S. Cl.
CPC ...... *G06F 3/04845* (2013.01); *G06F 3/04847* (2013.01); *G06N 3/045* (2023.01);
(Continued)

(58) Field of Classification Search
CPC ............. G06F 3/04845; G06F 3/04847; G06F 3/04842; G06N 3/0454; G06N 3/0472;
(Continued)

(56) References Cited

U.S. PATENT DOCUMENTS

2019/0122120 A1* 4/2019 Wu ................... G06N 3/084
2020/0019642 A1* 1/2020 Dua .................. G06F 16/3329
(Continued)

OTHER PUBLICATIONS

Chao Wang; Haiyong Zheng; Zhibin Yu; Ziqiang Zheng; Zhaorui Gu; Bing Zheng, "Discriminative Region Proposal Adversarial Networks for High-Quality Image-to-Image Translation", arXiv. org, Cornell University Library, 201 Olin Library Cornell University Ithaca, NY 14853, 201 Olin Library Cornell University Ithaca, NY 14853 , (Nov. 27, 2017), XP081410811.
(Continued)

*Primary Examiner* — Andrae S Allison

(57) ABSTRACT

Embodiments described herein provide a system for generating semantically accurate synthetic images. During operation, the system generates a first synthetic image using a first artificial intelligence (AI) model and presents the first synthetic image in a user interface. The user interface allows a user to identify image units of the first synthetic image that are semantically irregular. The system then obtains semantic information for the semantically irregular image units from the user via the user interface and generates a second synthetic image using a second AI model based on the semantic information. The second synthetic image can be an improved image compared to the first synthetic image.

20 Claims, 11 Drawing Sheets

(51) Int. Cl.
*G06N 3/04* (2023.01)
*G06N 3/045* (2023.01)
*G06N 3/047* (2023.01)
*G06N 3/08* (2023.01)
*G06N 3/088* (2023.01)
*G06T 5/00* (2006.01)
*G06T 7/11* (2017.01)
*G06T 7/143* (2017.01)
*G06T 7/35* (2017.01)
*G06T 11/00* (2006.01)

(52) U.S. Cl.
CPC ............ *G06N 3/047* (2023.01); *G06N 3/088* (2013.01); *G06T 5/002* (2013.01); *G06T 7/11* (2017.01); *G06T 7/143* (2017.01); *G06T 7/35* (2017.01); *G06T 11/00* (2013.01); *G06T 2207/20016* (2013.01); *G06T 2207/20081* (2013.01); *G06T 2207/20084* (2013.01)

(58) Field of Classification Search
CPC .......... G06N 3/088; G06N 3/08; G06N 3/105; G06T 5/002; G06T 7/11; G06T 7/143; G06T 7/35; G06T 11/00; G06T 2207/20016; G06T 2207/20081; G06T 2207/20084
See application file for complete search history.

(56) References Cited

U.S. PATENT DOCUMENTS

2020/0019863 A1* 1/2020 Dua ...................... G06F 16/313
2020/0026416 A1* 1/2020 Bala ...................... G06N 3/047

OTHER PUBLICATIONS

Machine Learning (2017) Improving the Realism of Synthetic Images. 11 pages.

* cited by examiner

SYSTEM AND METHOD FOR GENERATING PHOTOREALISTIC SYNTHETIC IMAGES BASED ON SEMANTIC INFORMATION

RELATED APPLICATIONS

This application is a continuation application of application Ser. No. 16/040,220, titled "System and Method for Generating Photorealistic Synthetic Images Based on Semantic Information," by inventors Raja Bala, Sricharan Kallur Palli Kumar, and Matthew A. Shreve, filed 19 Jul. 2018.

FIELD

This disclosure is generally related to the field of artificial intelligence (AI). More specifically, this disclosure is related to a system and method for generating synthetic images using an enhanced generative adversarial network (GAN) that incorporates semantic information.

RELATED ART

The exponential growth of AI-based techniques, such as neural networks, has made them a popular medium for generating synthetic data used in various applications. Generative adversarial networks (GANs) are a new technique for learning generative models for unstructured data. GANs have become popular for generating synthetic data, such as synthetic but realistic images. To do so, a GAN typically includes a generator neural network (which is referred to as a generator) and a discriminator neural network (which is referred to as a discriminator).

The generator may produce synthetic image samples as outputs. The generator can try to improve the quality of the synthetic image samples by "convincing" the discriminator that these images are real images. The discriminator is tasked with distinguishing real image samples from the generated synthetic image samples. The discriminator determines whether an image, as a whole, is real or not. As a result, through multiple iterations, the generator learns to generate a synthetic image that incorporates the statistical properties of a real image.

However, GANs often exhibit failures by producing unrealistic image renditions. Since a GAN may not incorporate semantic information, a synthetic image generated by a GAN may produce an overall "realistic" image (i.e., can have the statistical properties of a real image), but may have semantically unrealistic aspects that may manifest in localized regions of the image.

While GANs bring many desirable features to synthetic image generation, some issues remain unsolved for addressing semantic inaccuracies.

SUMMARY

Embodiments described herein provide a system for generating semantically accurate synthetic images. During operation, the system generates a first synthetic image using a first artificial intelligence (AI) model and presents the first synthetic image in a user interface. The user interface allows a user to identify image units of the first synthetic image that are semantically irregular. The system then obtains semantic information for the semantically irregular image units from the user via the user interface and generates a second synthetic image using a second AI model based on the semantic information. The second synthetic image can be an improved image compared to the first synthetic image.

In a variation on this embodiment, the system obtains a selection of a highlighting tool for the user interface. A region marked by the highlighting tool can be selectable via the user interface. This highlighting tool can correspond to one of: a grid-based selector, a polygon-based selector, and a freehand selector. If the highlighting tool is the grid-based selector, the system sets the highlighting tool at a granularity obtained from the user interface.

In a further variation, the system obtains a selection of a region selected by the highlighting tool in the user interface and obtains a weight allocated for the region.

In a variation on this embodiment, the first and second AI models are generative adversarial networks (GANs).

In a variation on this embodiment, the second AI model includes a discriminator that outputs a spatial probability map. A respective element of the spatial probability map indicates the probability of an image unit of the second synthetic image being realistic.

In a further variation, the second AI model includes a generator that outputs the second synthetic image in such a way that corresponding image units are different than the semantically irregular image units of the first synthetic image.

In a further variation, the system generates a spatial weight mask based on the obtained semantic information. The spatial weight mask comprises weights allocated to a respective image unit of the first synthetic image. The generator and the discriminator then determine the semantically irregular image units based on the spatial weight mask.

In a variation on this embodiment, an image unit corresponds to one or more of: a pixel, a pixel block, and a group of pixels of an irregular shape.

In a variation on this embodiment, generating the first and the second synthetic images includes mapping a noise vector into a synthetic image sample.

In a variation on this embodiment, the system generates a third synthetic image using the first AI model and automatically obtains semantic information for semantically irregular image units of the third synthetic image based on an irregularity detection technique. The system then generates a fourth synthetic image using the second AI model based on the automatically obtained semantic information.

BRIEF DESCRIPTION OF THE FIGURES

In the figures, like reference numerals refer to the same figure elements.

DETAILED DESCRIPTION

Figure 1A:
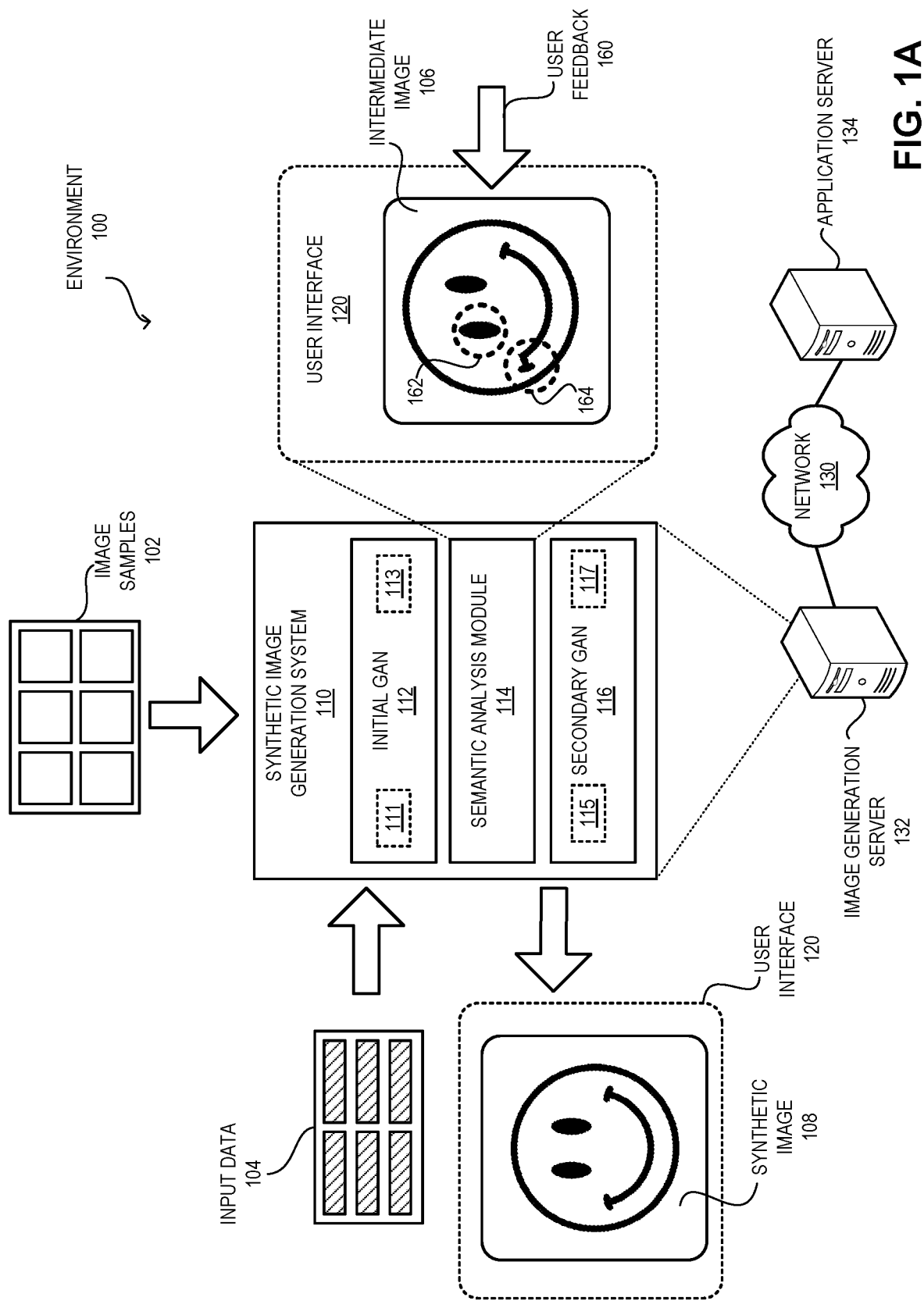
FIG. 1A illustrates an exemplary synthetic image generation system that incorporates semantic information, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of generating a photorealistic synthetic image using a generative adversarial network (GAN) by (i) allowing a user to provide semantic information using a specialized user interface; and (ii) using the semantic information to generate a photorealistic synthetic image. If the generated image is photorealistic (e.g., as realistic as a real photograph), that image can be used for a number of applications, such as visualization of new interior/industrial designs, new designs for apparel and accessories, training of computer vision algorithms, and creating scenes in computer games and animations.

Typically, a generator in a GAN generates a set of synthetic image samples as an output in an iteration. The generator, through multiple iterations, may try to improve the quality of the synthetic images by "convincing" the discriminator that these images are real images. The discriminator then distinguishes generated synthetic image samples from a set of real image samples. Based on the feedback from the discriminator, the generator generates synthetic image samples in such a way that they follow statistical properties of the real image samples.

With existing technologies, the discriminator only provides gradient information indicating whether an image, as a whole, is real or not. As a result, the generator learns to generate a synthetic image based on the statistical properties of an entire image at each iteration. Therefore, if the generator can generate a synthetic image, which has statistical properties (e.g., a distribution) close to the properties of a real image, the discriminator may mark that synthetic image as a real image. However, since the generator typically operates based on the overall statistical properties of the entire image, the generator fails to incorporate semantic information in parts of the image. In other words, the generator fails to accurately model parts of the image. For instance, when modeling faces, the generator fails to model features with semantic meaning, such as symmetry of the cheeks or the placement of an eye with respect to a nose. Furthermore, the generator may fail to model fine-grained features, such as wrinkles, lines under eyes, etc.

To solve these problems, embodiments described herein provide an efficient synthetic image generation system that generates photorealistic synthetic images based on semantic information. The system uses an initial GAN to generate an intermediate synthetic image, which may include semantic and/or fine-grained irregularities. The discriminator of the initial GAN, after convergence, can no longer distinguish the intermediate image as a synthetic image generated by the generator.

The system then uses a secondary GAN to generate an improved synthetic image based on semantic information. In this secondary GAN, the discriminator is capable of identifying the regions of a synthetic image that resulted in its decision to classify the image as a real or a synthetic image. This determination can be done based on semantic information of the image. In turn, the generator of the secondary GAN uses the information from the discriminator about the parts that led to its samples being classified as synthetic, and modifies its weights so that it focuses on improving the specific parts identified by the discriminator.

Since humans are particularly adept at spotting whether or not a portion of an image is realistic, in some embodiments, the system obtains the semantic information from a user. The system can present the intermediate image in a specialized user interface. This user interface allows a user to identify areas of the intermediate image that may include irregularities. The user can set the granularity of the image region that can be selected as an irregular image region. This granularity can vary from large image blocks to an individual pixel. For example, the regions are not restricted to belonging to rectangular blocks, but instead may be defined by boundaries of semantic objects (e.g., a person's ear or eye on an image). In this way, the user can provide semantic information (e.g., how the image should really look) to the system.

In some embodiments, the user allocates weights to each of the selected image regions in such a way that the weights reflect the semantic information (e.g., semantic quality of the regions). For example, if a particular image region is semantically inaccurate (e.g., does not look like a real picture), the user may assign a high weight to that region. For example, if the intermediate image depicts a human face, the user can use the user interface to indicate that the right eye and lower right cheek are unrealistic. The granularity of the grid can allow the users to select semantic regions, rather than rectangular patches. This information from the user can then be used by the generator to produce better synthetic images by focusing on the specific regions which are irregular.

Exemplary System

FIG. 1A illustrates an exemplary synthetic image generation system that incorporates semantic information, in accordance with an embodiment of the present application. In this example, an environment 100 includes an application server 134, which can host one or more applications that use photorealistic images. Such applications include, but are not limited to, visualization of new interior/industrial designs, new designs for apparels and accessories, and scenes in computer games and animations. An image generation server 132 of environment 100 can generate synthetic images and provide the synthetic images to application server 134. In some embodiments, image generation server 132 communicates with application server 134 via a network 130, which can be a local or a wide area network.

Image generation server 132 can use a GAN 112 to generate the synthetic images. Typically, a generator 111 in GAN 112 generates a set of synthetic image samples as an output in an iteration. Generator 111, through multiple iterations, may try to improve the quality of the synthetic images by "convincing" a discriminator 113 of GAN 112 that these images are real images. Discriminator 113 then distinguishes generated synthetic image samples from a set of real image samples 102. Generator 111 and discriminator 113 can also use a set of input data 104, which can include a set of noise vectors. Based on the feedback from discriminator 113, generator 111 generates synthetic image samples in such a way that they follow statistical properties of real image samples 102 based on input data 104.

With existing technologies, discriminator 113 only provides gradient information indicating whether an image, as a whole, is real or not. As a result, generator 111 only learns to generate a synthetic image based on the statistical properties of an entire image at each iteration. Therefore, if generator 111 can generate a synthetic image 106, which has statistical properties (e.g., a distribution) close to the properties of the set of real image samples 102, discriminator 113 may determine that image 106 is a real image. However, since generator 111 typically operates based on the overall statistical properties of the entire image, generator 111 may fail to incorporate semantic information in parts of image 106. In other words, generator 111 can fail to accurately model parts of image 106. For example, if image 106 includes a face, generator 111 may fail to model features with semantic meaning, such as symmetry of the cheeks or the placement of an eye with respect to a nose. Furthermore, generator 111 may fail to model fine-grained features, such as wrinkles, lines under eyes, etc.

To solve these problems, a synthetic image generation system 110 can use a GAN 116 to generate a synthetic image 108 based on semantic information. Server 132 can include a set of system hardware, such as a processor (e.g., a general purpose or a system processor), a memory device (e.g., a dual in-line memory module or DIMM), and a storage device (e.g., a hard disk drive or a solid-state drive (SSD)). The system software, such as the operating system and device firmware, can run on the system hardware. System 110 can be a hardware module in the system hardware, a software system that can operate on the system hardware, or both. System 110 can consider synthetic image 106 as an intermediate synthetic image and use semantic information associated with intermediate synthetic image (or intermediate image) 106 to generate semantically accurate images.

In GAN 116, discriminator 117 is capable of identifying the regions of image 106 that resulted in its decision to classify the image as a real or a synthetic image. For example, discriminator 117 can allocate different weights to different regions of image 106 (e.g., a high weight to the regions that are unrealistic). This determination can be done based on semantic information of the image. In turn, generator 115 of GAN 116 uses the information from discriminator 117 about the parts that led to image 106 being classified as synthetic, and modifies the weights so that generator 115 focuses on improving the specific parts identified by discriminator 117.

Since humans are particularly adept at spotting whether or not a portion of an image is realistic, in some embodiments, system 110 obtains the semantic information from a user. System 110 can use GAN 112 as an initial GAN and image 106 as an intermediate image. System 110 then uses semantic information associated with image 106 to generate a photorealistic synthetic image. Discriminator 113, after convergence, can no longer distinguish image 106 as a synthetic image generated by generator 111. System 110 can be equipped with a semantic analysis module 114 that analyzes semantic information associated with image 106. System 110 can present image 106 in a user interface 120. This user interface 120 can be a specialized user interface that allows a user to identify areas of image 106 that may include irregularities.

The user can set the granularity of the image region that can be selected as an irregular image region in user interface 120. This granularity can vary from large image blocks to an individual pixel. For example, the user can provide a feedback 160, which may define an image region 162 to indicate that an eye of the face is not placed in a semantically meaningful way and an image region 164 to indicate that a cheek of the face is irregularly shaped. In other words, in image 106, the user can use user interface 120 to indicate that the right eye and lower right cheek are unrealistic. Module 114 can obtain additional information from the user for image regions 162 and 164 (e.g., why they are semantically irregular).

By avoiding the semantic irregularities in image 106, generator 115 eventually generates a more refined synthetic image 108. Since synthetic image 108 does not include the semantic irregularities, synthetic image 108 can be a photorealistic image that can be used by application server 134. In some embodiments, system 110 can display synthetic image 108 in user interface 120 to receive an approval from the user prior to providing synthetic image 108 to application server 134. System 110 can display user interface 120 on a local device (e.g., on a display device of server 132) or a remote device (e.g., on a display device of server 134). In this way, system 110 can operate in a distributed way and generate synthetic images and obtain user feedback from the same device or from different devices.

Figure 1B:
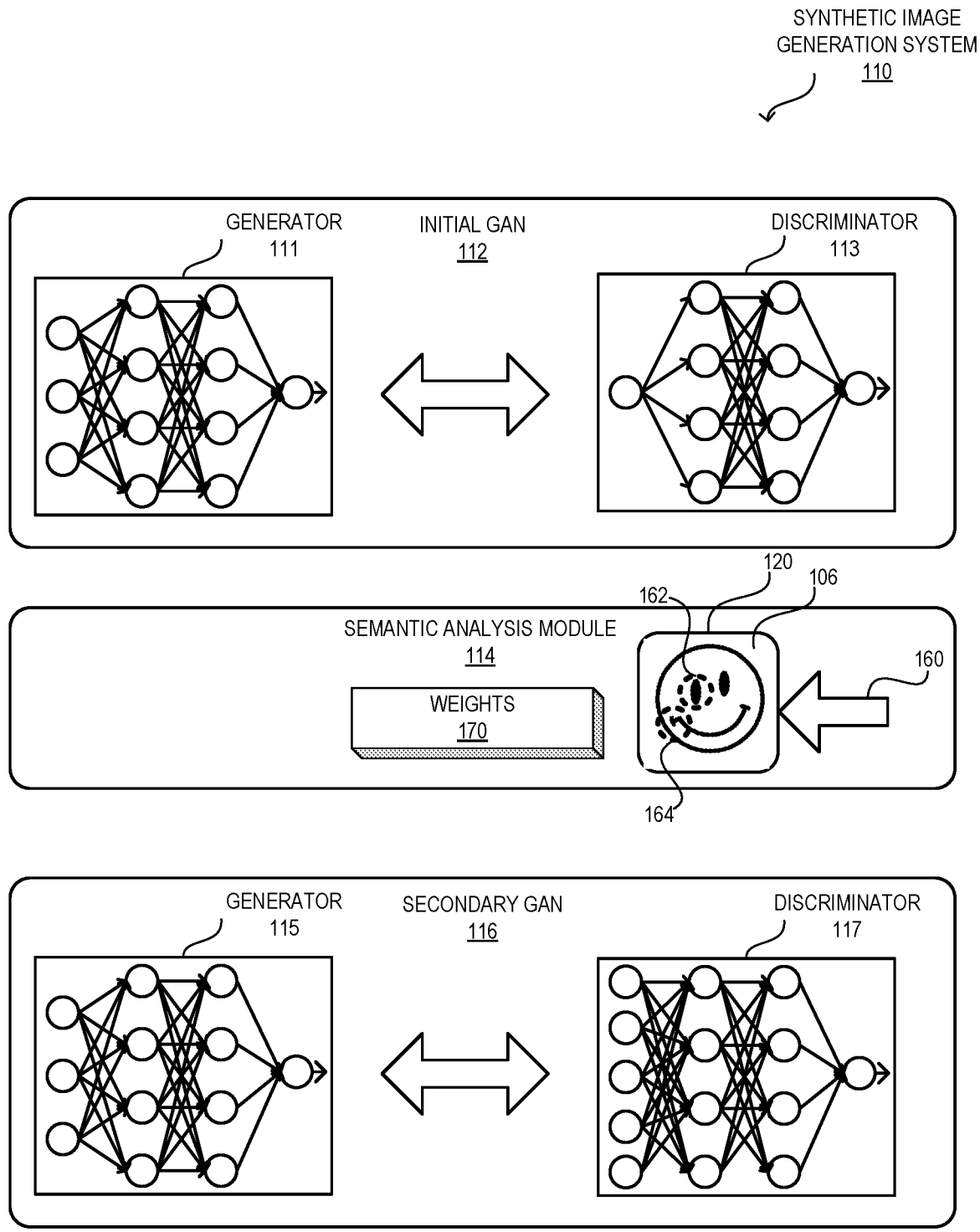
FIG. 1B illustrates exemplary components of a synthetic image generation system that incorporates semantic information, in accordance with an embodiment of the present application.

FIG. 1B illustrates exemplary components of a synthetic image generation system that incorporates semantic information, in accordance with an embodiment of the present application. System 110 trains a generative neural network, generator 111, with a set of parameters by operating generator 111 to produce synthetic images. These images should be generated in such a way that they can convince a discriminator neural network, discriminator 113, that the images are real images. The output of generator 111 can be an image and the output of discriminator 113 can be the probability that an image is real. When generator 111 generates image 106 and discriminator 113 indicates that the probability of image 106 being a real image is greater than a threshold, system 110 provides intermediate image 106 to semantic analysis module 114 for semantic analysis.

To do so, system 110 can then obtain user feedback 160. In some embodiments, the user provides user feedback 160 by allocating weights 170 (e.g., a value between 0 and 5) to the selected image regions 162 and 164 in such a way that weights 170 reflect the semantic quality of the given region.

For example, since the eye and cheek of the face on intermediate image 106 are semantically inaccurate (e.g., does not look like a real picture), the user may assign a high weight to image regions 162 and 164. In this way, weights 170 can be used as a measure of severity of irregularity for image regions 162 and 164 that quantifies how unrealistic each of images regions 162 and 164 is. Weights 170 can include different weights for each of the pixels in the image regions 162 and 164.

User interface 120 can impose a highlighting grid over intermediate image 106 that allows the user to select image regions 162 and 164. If the granularity of the grid is fine (e.g., at the pixel level), user interface 120 can allow the users to select semantic regions, rather than rectangular patches. This information from the user can then be used by generator 115 to produce better synthetic images by focusing on the specific regions which are irregular.

System 110 can train GAN 116, in which discriminator 117 outputs a spatial probability map of the same dimension as a synthetic image generated by generator 115. This dimension can be expressed based on an image unit, such as a pixel or a pixel group (e.g., a block of 5-by-5 pixels or arbitrarily shaped connected group of pixels). Unlike discriminator 113, which outputs a single probability for an entire image, discriminator 117 outputs a set of probabilities, each indicating whether a specific image unit of an image is realistic. This enables image quality and realism to be encouraged at the local rather than global level.

Furthermore, weights 170 can be used as (or converted to) a spatial weight mask of the same dimension as the spatial probability map. For example, if the user allocates a weight for image region 162, that weight is allocated to each image unit in image region 162. Similarly, the weight for image region 164 is allocated to each image unit in image region 162. It should be noted that the user may provide individual weights to each image unit of an image region. The rest of the image units of intermediate image 106 can be assigned a default lower weight (or a user-assigned weight, if provided).

In this way, the spatial weight mask emphasizes parts of intermediate image 106 that have been specifically identified as being of poor quality or unrealistic visual appearance. The combination of the spatial probability map and the spatial weight mask causes GAN 116 to discourage generating new synthetic images that are too similar to previously generated synthetic images in those regions of low semantic quality (e.g., by GAN 112). For example, a weighted average of the spatial probabilities computed by discriminator 117 can indicate whether a synthetic image generated by generator 115 is realistic or not. In this way, the computations of GAN 116 remain tractable (i.e., solvable by a polynomial-time algorithm).

Specialized User Interface

Figure 2:
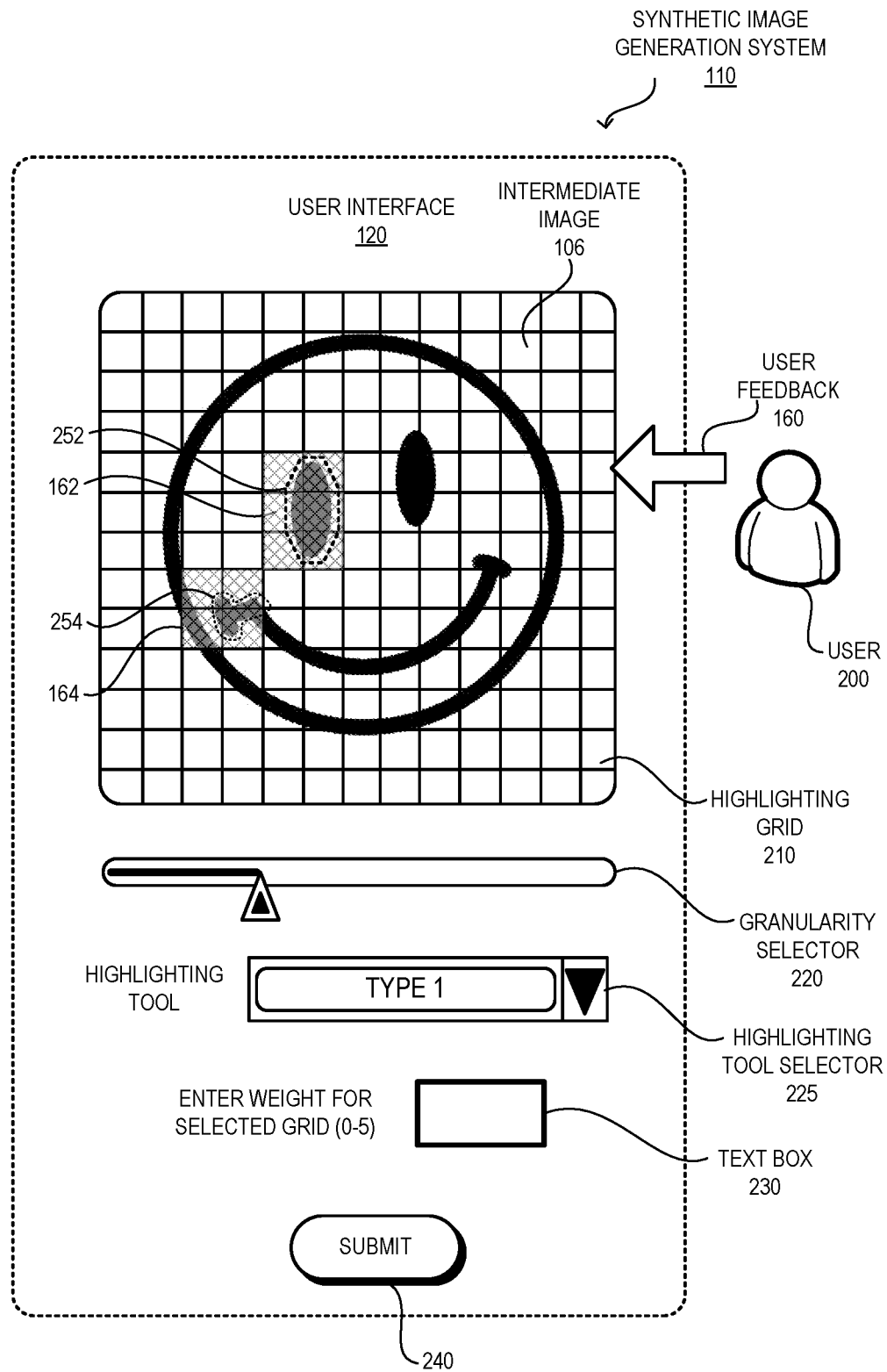
FIG. 2 illustrates an exemplary specialized user interface that facilitates incorporation of semantic information into synthetic image generation, in accordance with an embodiment of the present application.

FIG. 2 illustrates an exemplary specialized user interface that facilitates incorporation of semantic information into synthetic image generation, in accordance with an embodiment of the present application. User interface 120 can present intermediate image 106 to a user 200 to obtain semantic user feedback 160. User interface 120 can obtain user feedback 160 from one or more of: a touchscreen, a pointing device, a gesture-detection device, a camera, and a keyboard. User interface 120 can impose a highlighting grid 210 over intermediate image 106 that allows user 200 to select image regions 162 and 164. User 200 can use a granularity selector 220 to select the granularity of grid 210. Examples of granularity selector 220 include, but are not limited to, a track bar with a slider in a channel, a drop-down menu, and a text box. The granularity of grid 210 indicates the image unit. In other words, the dimensions of each grid element can represent an image unit.

For example, user 200 can select the granularity of grid 210 at a pixel level. The image unit then becomes a pixel of intermediate image 106. On the other hand, if user 200 selects the granularity of grid 210 at a 5-by-5 pixel block, the image unit becomes the pixel block. If the granularity of the grid is fine (e.g., at the pixel level), user interface 120 can allow user 200 to select semantic regions, rather than rectangular patches. This information from user 200 can then be used by GAN 116 of FIG. 1A to produce better synthetic images by focusing on the specific regions which are irregular.

In some embodiments, system 110 can pre-allocate a weight to each grid. User 200 can select and highlight each individual grid element to indicate whether the corresponding image unit is semantically irregular. User 200 can select a grid element by clicking on it using a touchscreen, a pointing device, and/or a gesture. When user 200 selects a grid element, that grid element can become highlighted (shown as a shaded area) on user interface 120 and can remain highlighted. User interface 120 can present a text box 230 and a corresponding prompt to enter a weight for the highlighted grid element. User 200 can enter a weight into the text box, which is then assigned to the highlighted grid element and, therefore, to the corresponding image unit. In some embodiments, system 110 can pre-allocate a weight to each grid element. When user 200 selects a grid element and assigns a weight, that weight replaces the pre-allocated weight of that grid element.

User 200 can select a number of grid elements of highlighting grid 210 to define image regions 162 and 164. Here, image region 162 can indicate that an eye of the face is not placed in a semantically meaningful way and image region 164 can indicate that a cheek of the face is irregularly shaped. In other words, in intermediate image 106, user 200 can use highlighting grid 210 to indicate that the right eye and lower right cheek are unrealistic. Once a particular grid element is selected, that grid element can remain highlighted. User 200 may click on a selected grid element to unselect that grid element. If a grid element is unselected, system 110 may reassign the default weight to the grid element. User interface 120 can also allow user 200 to select a non-rectangular region (e.g., a polygon) and a freehand markup of region of interest. In the example of FIG. 2, user 200 can select a region 252 of a polygonal shape to select the right eye of the face and a freehand or irregular-shaped region 254 to select the right cheek. Instead of selecting individual grid, user 200 can then select the entire region (e.g., region 252 or 254) to allocate a weight to the region.

User interface 120 can allow user 200 to select a type of highlighting tool using a highlighting tool selector 225 (e.g., a drop-down menu). Examples of highlighting tools include, but are not limited to, a highlighting grid, a polygonal tool (e.g., allows user 200 to select region 252 using polygons), and a freehand tool (e.g., allows user 200 to use touch or a pointing device to select region 254). User interface 120 can also provide different shapes (e.g., a circle and a hexagon) for the highlighting grid and the polygon tool. If user 200 selects one grid element and provides a weight, system 110 stores that weight in a local storage device. Selecting a different grid element and/or the submission of the image can initiate the storage. User interface 120 can also include a "submit" button 240 that allows user 200 to submit user feedback 160 for image 106. If GAN 112 of system 110 has generated more synthetic images, user interface 120 can display the next image from those images. In this way, user interface 120 continues to display synthetic images and obtain corresponding user feedback. System 110 can select images for presenting in user interface 120 to user 200 based on one or more selection policies. For example, system 110 can present a respective synthetic image, which have a discriminator score below a threshold, in user interface 120. Here, the discriminator score can indicate the probability of the synthetic image being real. System 110 can also randomly select images for presentation.

Figure 3:
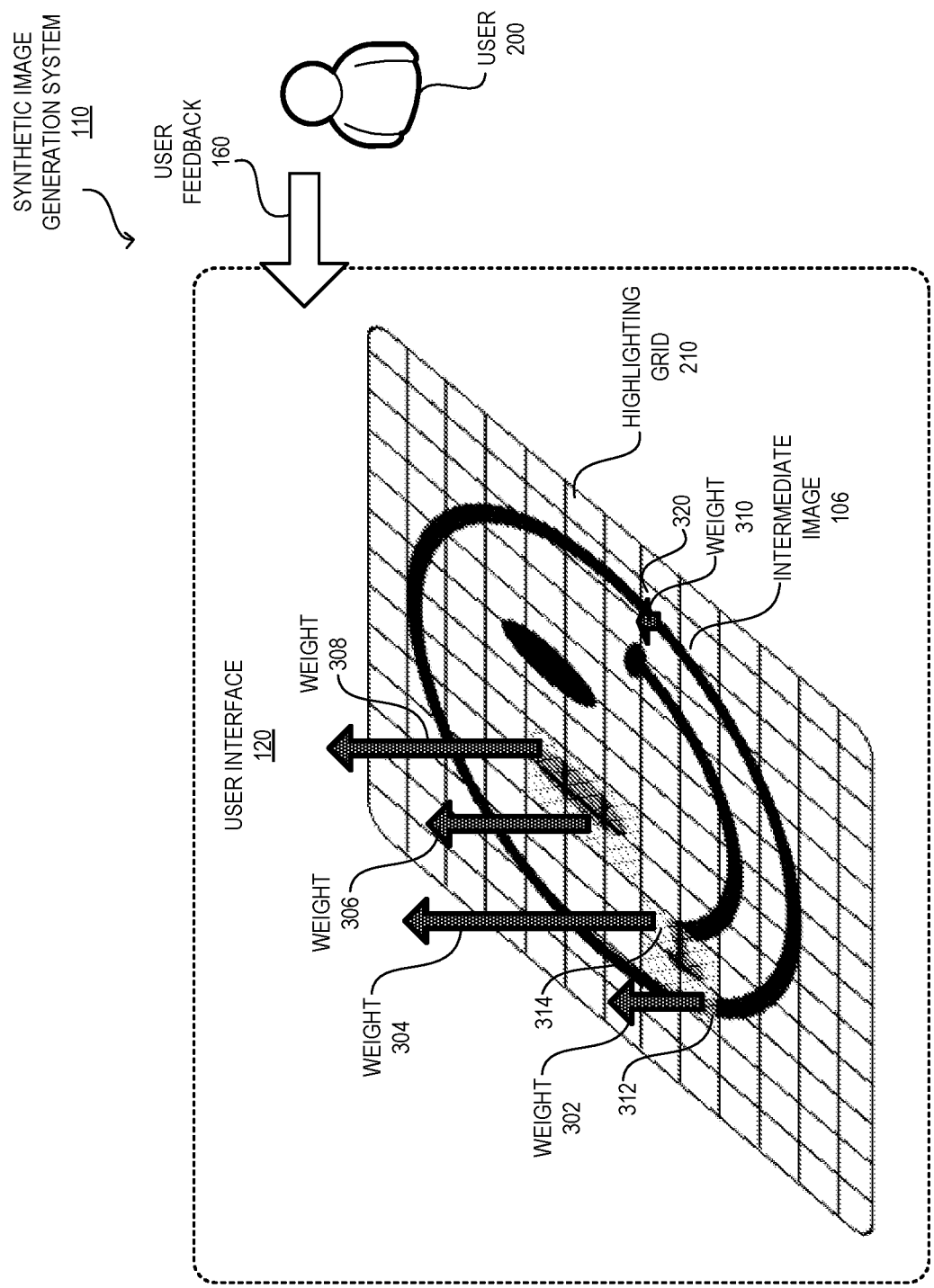
FIG. 3 illustrates an exemplary allocation of weights to image regions of a synthetic image, in accordance with an embodiment of the present application.

FIG. 3 illustrates an exemplary allocation of weights to image regions of a synthetic image, in accordance with an embodiment of the present application. In this example, the weight of a grid element is represented by a shaded arrow. The length of each arrow can indicate the value of the weight. For example, user 200 may determine that grid element 314 represents a significant portion of the irregularly shaped cheek of the face depicted in image 106 and assign a weight 304 that carries a high value. On the other hand, user 200 may determine that grid element 312 represents a small portion of the cheek and most of the grid element is correct. User 200 then can assign a weight 302 that carries a relatively lower value.

In the same way, based on the level of semantic irregularities of the irregularly positioned eye of intermediate image 106, user 200 may assign different weights 306 and 208 to different grid elements representing the eye. If user 200 does not select a grid element, system 110 can assign a default weight to that grid element. For example, since grid element 320 represents a part of the face that is semantically meaningful and accurate, user 200 may not select grid element 320 while providing user feedback 160. System 110 can assign a default weight 310 to grid element 320 and all other grid elements for which user 200 has not provided a weight.

Synthetic Image Generation using Semantic Information

Figure 4:
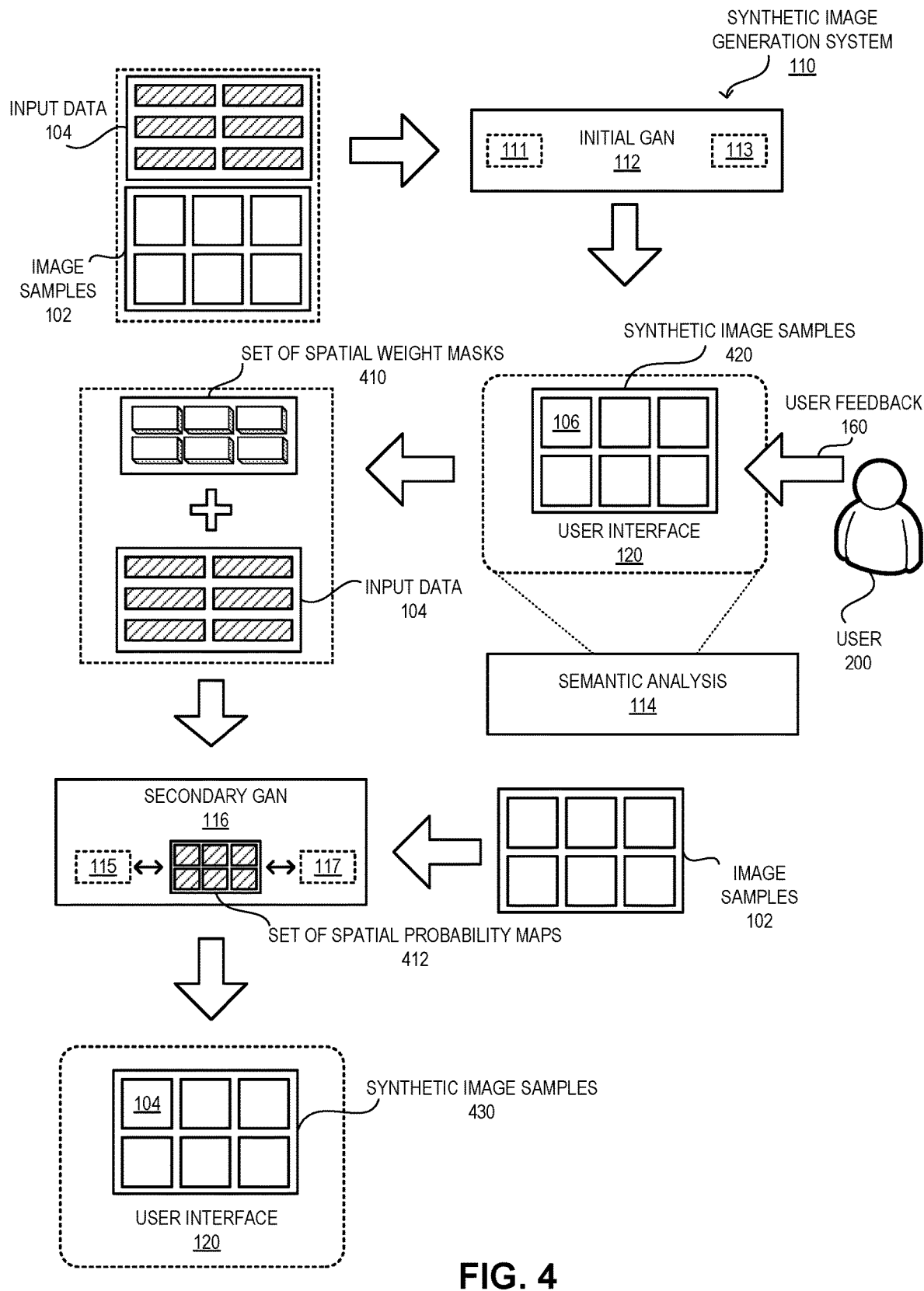
FIG. 4 illustrates an exemplary dataflow among components of a synthetic image generation system generating a synthetic image based on semantic information, in accordance with an embodiment of the present application.

FIG. 4 illustrates an exemplary dataflow among components of a synthetic image generation system generating a synthetic image based on semantic information, in accordance with an embodiment of the present application. System 110 uses an initial GAN 112 for generating synthetic images. GAN 112 can include generator 111 and discriminator 113. System 110 can train generator 111, a generative neural network $G'_\theta$, with parameters $\theta$ by operating generator 111 to produce synthetic images that can convince discriminator 113, a discriminator neural network $D'_\phi$ parameterized by $\phi$, that the synthetic images are real. Generator 111 and discriminator 113 have competing objectives, and aim to minimize loss functions $L'_g$ and $L'_d$, respectively.

Discriminator 113 can be trained using a set of image samples 102 (i.e., real images). Generator 111 can also use a set of input data 104, which can include a set of noise vectors. A noise vector can be a set of images (or any other information) that generator 111 learns from. Generator 111 can then apply the learned properties of the noise vectors to image samples 102 for generating a set of synthetic image samples 420. Suppose that $X_i$ is the set of image samples 102, and $z_i$ is the set of corresponding noise vectors in input data 104. Here, i can be the index for set of image samples 102 and the set of corresponding noise vectors. Synthetic image samples 420 can then be indicated by $G'_\theta(z_i)$. GAN 112 generates $G'_\theta(z_i)$ by minimizing loss functions $L'_g$ and $L'_d$.

The loss functions to be minimized can be:

$$L'_d(D'_\phi, G_\theta) = -\sum_{i=1}^{N} \log(D'_\phi(X_i) + \log(1 - D'_\phi(G'_\theta(z_i)))), \text{ and}$$

$$L'_g(D'_\phi, G_\theta) = -\sum_{i=1}^{N} \log(D'_\phi(G'_\theta(z_i))),$$

where the output of $G'_\theta(\ )$ is an image, and the output of $D'_\phi(\ )$ is the probability that an image is real (e.g., a probability value between 0 and 1). By minimizing the loss functions, generator 111 can improve its output by ensuring that $D'_\phi(G'_\theta(z_i))$ yields a high probability. In this way, discriminator 113 may not be able to distinguish image samples 102 from generated synthetic image samples 420.

However, synthetic image samples 420, which include intermediate image 106, can include semantic irregularities. For example, when modeling faces, generator 111 may fail to model fine-grained features such as wrinkles, lines under eyes, etc. System 110 presents synthetic image samples 420 to user 200 in user interface 120. User 200 can identify, in each image of synthetic image samples 420, image regions with semantic irregularities. User 200 can provide user feedback 160 via user interface 120 by allocating weights to the identified image regions. System 110 may also deploy a semantic analysis technique that may facilitate automatic determination of image quality or naturalness to obtain the weights.

System 110 uses a secondary GAN 116 that incorporates the feedback from user 200 (or the semantic analysis technique). GAN 116 uses synthetic image samples 420, $G'_\theta(z_i)$, as input. GAN 116 includes generator 115, a generative neural network $G_\theta$, with parameters $\theta$ and discriminator 117, a discriminator neural network $D_\phi$ parameterized by $\phi$. Discriminator 117 ($D_\phi(\ )$) outputs a spatial probability map of the same dimension as a synthetic image generated by generator 115. This dimension can be expressed based on an image unit. The spatial probability map includes a set of probabilities, each indicating whether a specific image unit of an image is realistic. This enables semantic image quality and realism to be encouraged at the local rather than global level. Discriminator 117 generates one such spatial probability map for each image in $G'_\theta(z_i)$, forming a set of spatial probability maps 410.

Furthermore, the weights provided by user 200 can be used to generate a spatial weight mask, $w_i$, of the same dimension as the spatial probability map. Each image in $G'_\theta(z_i)$ is associated with such a spatial weight mask, forming a set of spatial weight masks 412. $w_i$ emphasizes the image regions that have been identified by user 200 as semantically irregular. Generator 115 and discriminator 117 have competing objectives, and aim to minimize loss functions $L_g$ and $L_d$, respectively.

GAN 116 generates a set of synthetic image samples 430, $G_\theta(z_i)$, by minimizing loss functions $L_g$ and $L_d$. This can include mapping the noise vectors into synthetic image samples 420. The loss functions to be minimized can be:

$$L_d(D_\phi, G_\theta) = -E\left\{\sum_{i=1}^{N} \log(D_\phi(X_i) + \log(1 - w_i D_\phi(G_\theta(z_i))))\right\}, \text{ and}$$

$$L_g(D_\phi, G_\theta) = -E\left\{\sum_{i=1}^{N} \log(D_\phi(G_\theta(z_i))) - w_i \|G_\theta(z_i) - G'_\theta(z_i)\|\right\},$$

where E{ } denotes expectation (i.e., average) over a set of image units for a specific synthetic image $G_\theta(z_i)$. The term $w_i \|G_\theta(z_i) - G'_\theta(z_i)\|$ in $L_g(D_\phi, G_\theta)$ discourages synthetic image samples 430 from being too similar to synthetic image samples 420 in the image regions that are semantically irregular.

In this way, GAN 116 can generate synthetic image samples 430, which are photorealistic. Such photorealistic synthetic images can be used in different applications, including data augmentation for training computer vision systems and visualization of images characterized by desired attributes. GAN 116 allows system 110 to learn highly accurate and visually realistic generative models for unstructured data, such as images. GAN 116 can also be used to produce better classifiers and visualization modules for unstructured data.

Operations

Figure 5A:
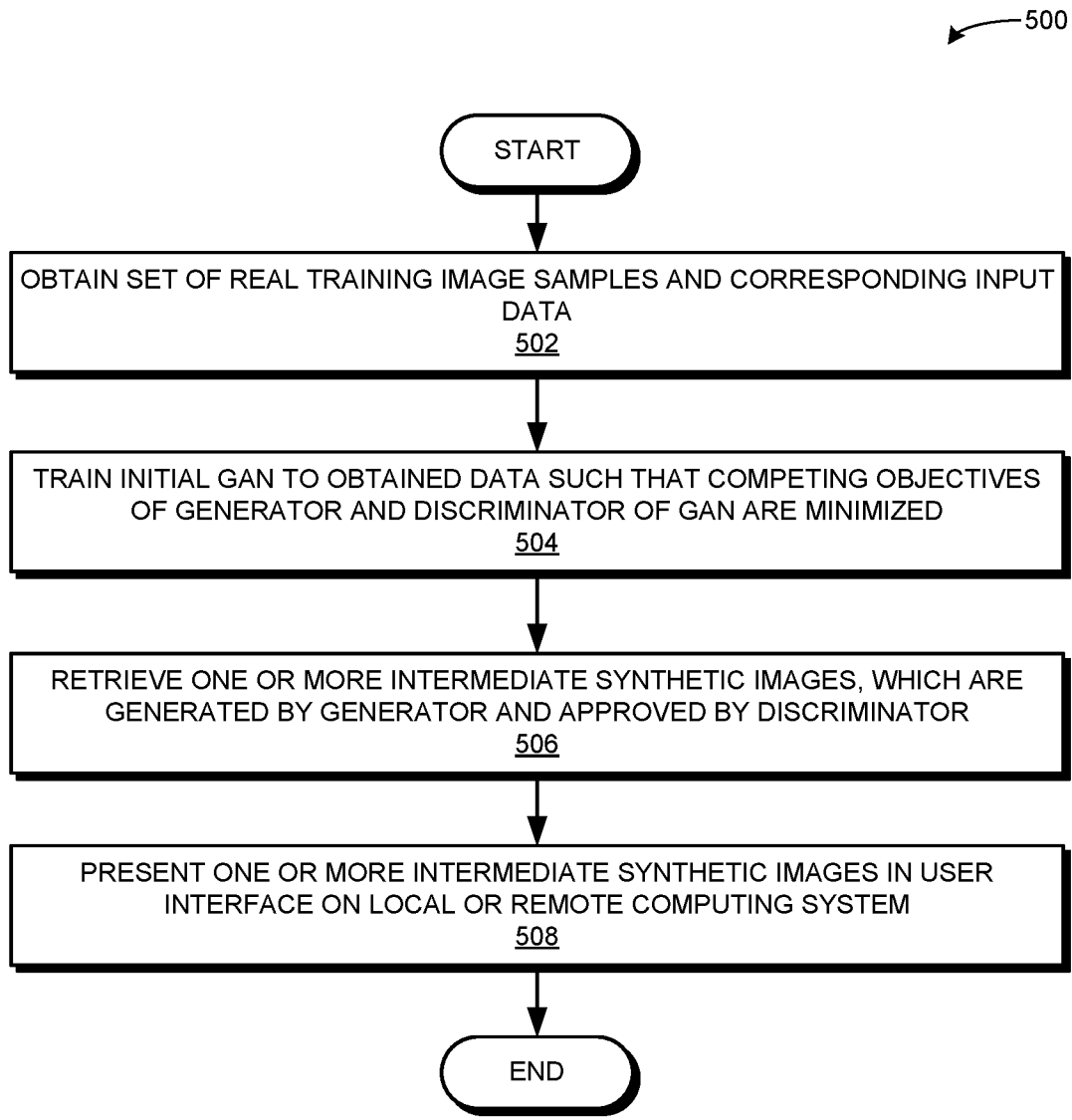
FIG. 5A presents a flowchart illustrating a method of a synthetic image generation system generating one or more intermediate synthetic images, in accordance with an embodiment of the present application.

FIG. 5A presents a flowchart 500 illustrating a method of a synthetic image generation system generating one or more intermediate synthetic images, in accordance with an embodiment of the present application. During the training operation, the system obtains a set of real training image samples and corresponding input data (operation 502). The input data can include noise vectors. The system trains an initial GAN to the obtained data such that competing objectives of the generator and the discriminator of the initial GAN are minimized (operation 504). The system then retrieves one or more intermediate synthetic images, which are generated by the generator and approved by the discriminator (operation 506). The approval for a synthetic image can be based on a probability indicating how realistic that image is. If the probability is greater than a threshold, the discriminator can approve the image. The system then presents the one or more intermediate synthetic images in a user interface of a local or a remote computing system (operation 508).

Figure 5B:
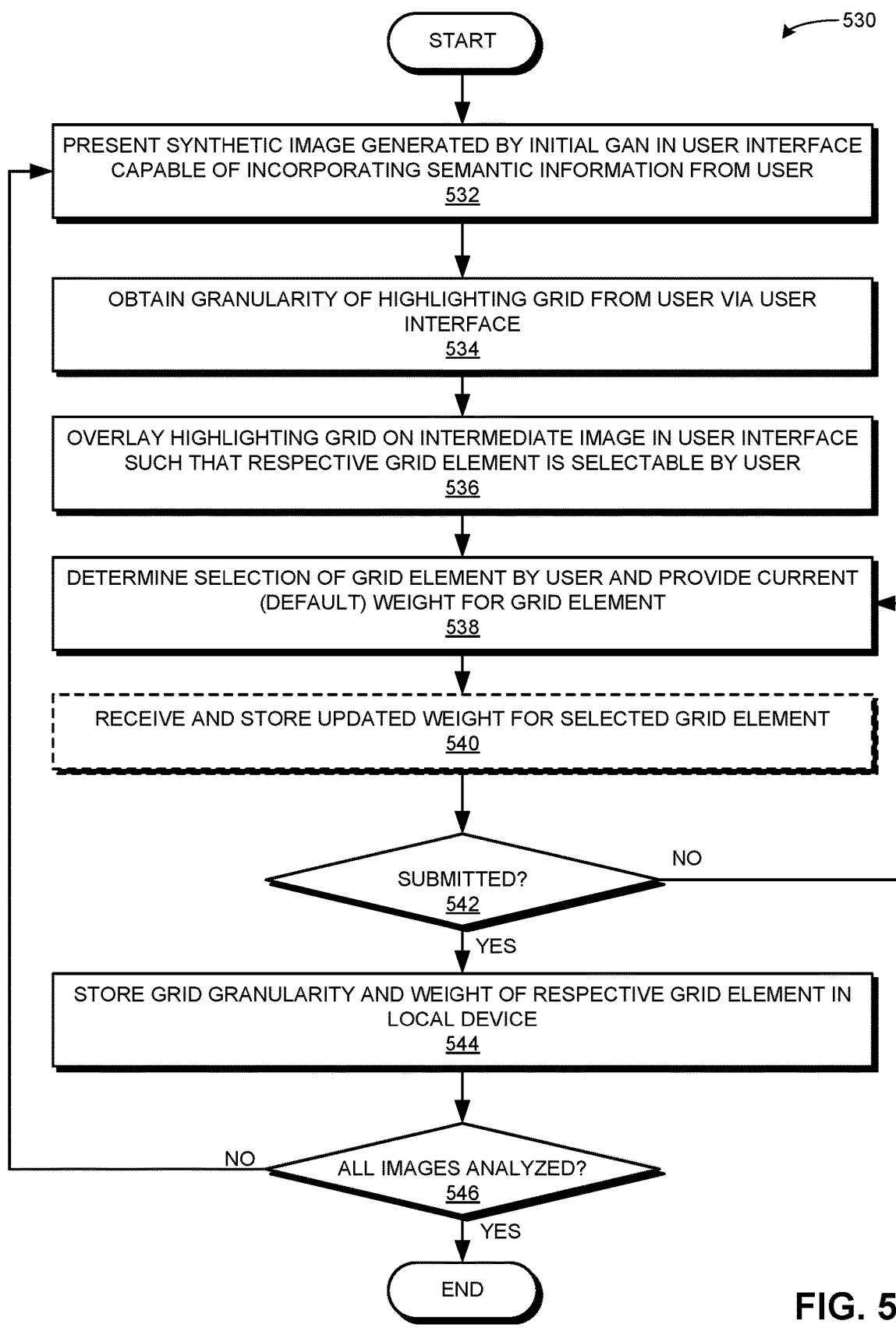
FIG. 5B presents a flowchart illustrating a method of a synthetic image generation system obtaining semantic information associated with one or more intermediate synthetic images, in accordance with an embodiment of the present application.

FIG. 5B presents a flowchart 530 illustrating a method of a synthetic image generation system obtaining semantic information associated with one or more intermediate synthetic images, in accordance with an embodiment of the present application. During operation, the system presents a synthetic image, which can be considered as an intermediate image, generated by an initial GAN in a user interface, which can be a specialized user interface capable of incorporating semantic information from the user (operation 532). The system then obtains the granularity of a highlighting grid from a user via the user interface (operation 534). The system then overlays the highlighting grid on the intermediate image in the user interface such that a respective grid element can be selectable by the user (operation 536).

The system then determines a selection of a grid element by the user and provides a current weight, which can be the default weight, for the grid element (operation 538). If the user provides an updated weight, the system can, optionally, receive and store the updated weight for the selected grid element (operation 540). The system then determines whether the user has submitted feedback, which includes semantic information, for the intermediate image (operation 542). If the user has not submitted the feedback, the system continues to determine a selection of a grid element by the user (operation 538). If the user has submitted the feedback, the system stores the grid granularity and the weight of a respective grid element in a local storage device (operation 544). The system then determines whether all images in the set of intermediate images generated by a generator has been analyzed by the user (operation 546). If all images have not been analyzed, the system continues to present the next synthetic image in the user interface (operation 532).

Figure 5C:
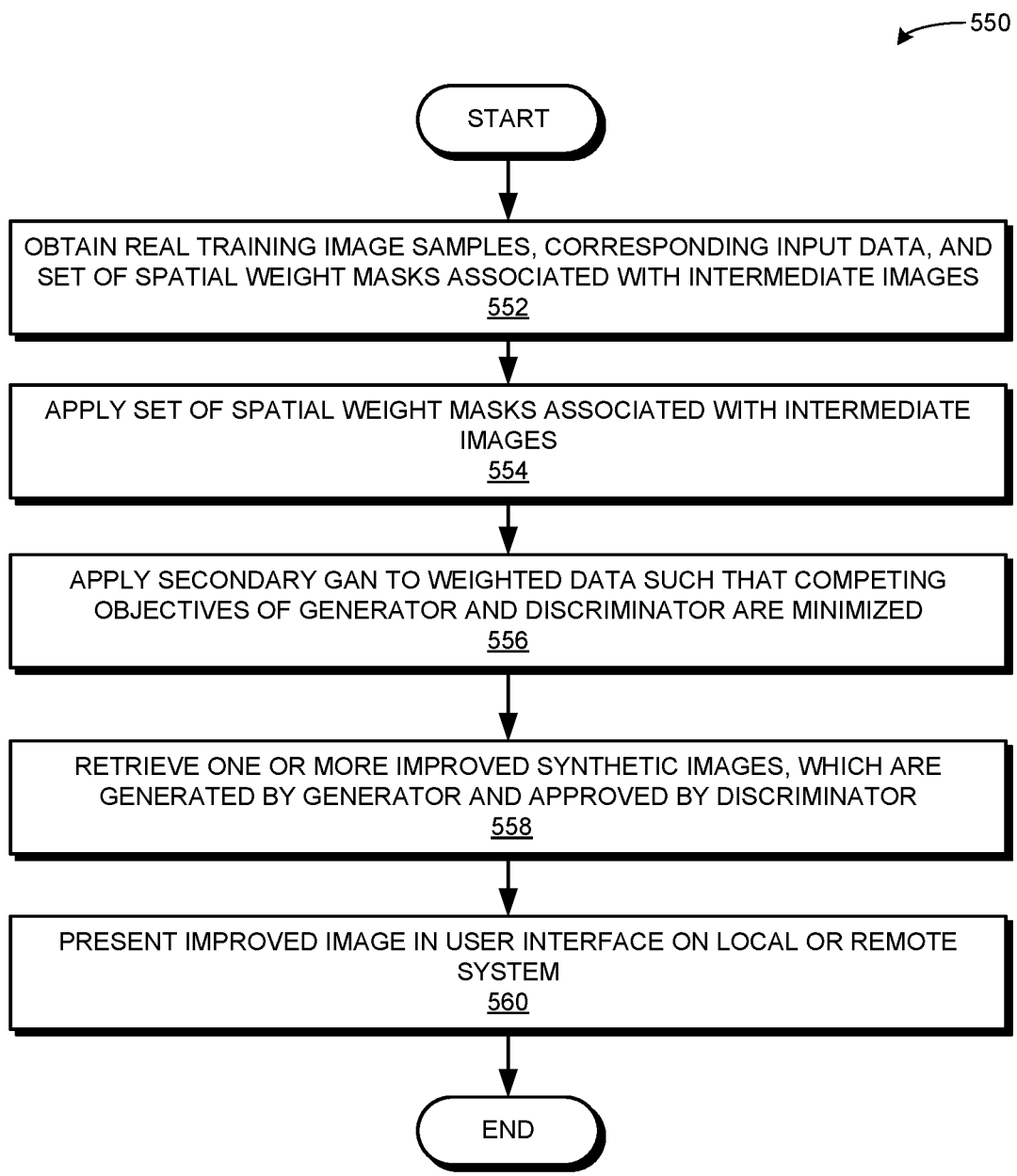
FIG. 5C presents a flowchart illustrating a method of a synthetic image generation system generating one or more final synthetic images based on semantic information, in accordance with an embodiment of the present application.

If all images have been analyzed, the system has completed obtaining semantic information from the user. FIG. 5C presents a flowchart 550 illustrating a method of a synthetic image generation system generating one or more improved synthetic images based on semantic information, in accordance with an embodiment of the present application. During operation, the system obtains a set of real training image samples, corresponding input data, and a set of spatial weight masks for the intermediate images (operation 552) and applies the set of spatial weight masks to the intermediate images (operation 554). The system applies a secondary GAN to the weighted data such that competing objectives of the generator and the discriminator of the secondary GAN are minimized (operation 556). The system then retrieves one or more improved synthetic images, which are generated by the generator and approved by the discriminator (operation 558). The system then presents the one or more final synthetic images in a user interface of a local or a remote computing system (operation 560).

Figure 6:
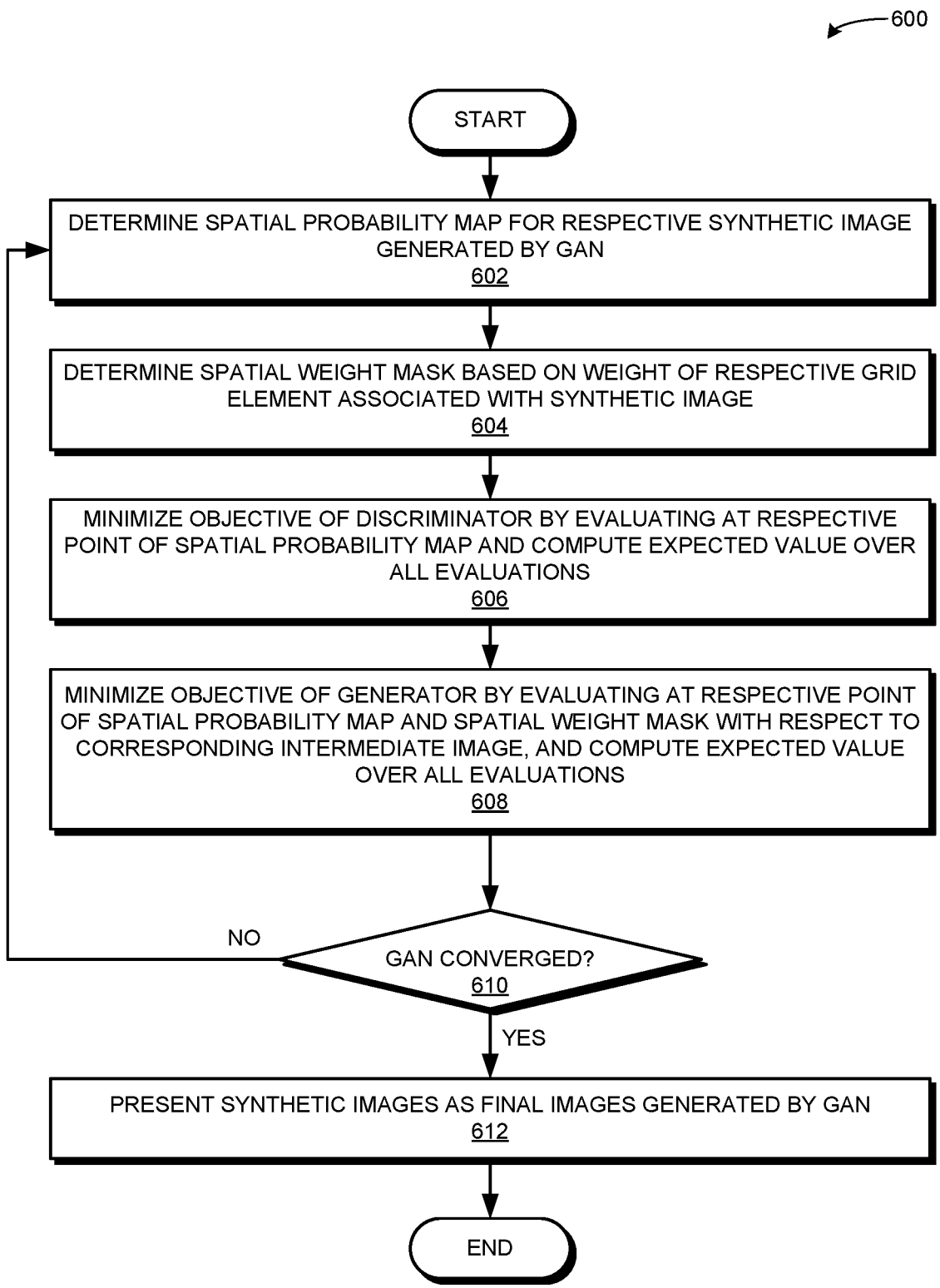
FIG. 6 presents a flowchart illustrating a method of a synthetic image generation system using a GAN for generating synthetic images by incorporating semantic information, in accordance with an embodiment of the present application.

FIG. 6 presents a flowchart 600 illustrating a method of a synthetic image generation system using a GAN for generating synthetic images by incorporating semantic information, in accordance with an embodiment of the present application. During operation, the system determines a spatial probability map for a respective synthetic image generated by the GAN (operation 602) and a spatial weight mask based on the weight of a respective grid element associated with the synthetic image (operation 604). The system then minimizes the objective of the discriminator of the GAN by evaluating at a respective point of the spatial probability map and computes an expected value over all evaluations (operation 606).

The system also minimizes the objective of the generator of the GAN by evaluating at a respective point of the spatial probability map and the spatial weight mask with respect to a corresponding intermediate image, which can be generated by a different GAN, and computes an expected value over all evaluations (operation 608). The system checks whether the GAN has converged (operation 610). The GAN may converge if the discriminator does not distinguish the synthetic images from real images. If the GAN has not converged, the system continues to determine a spatial probability map for a respective synthetic image generated by the GAN (operation 602). If the GAN has converged, the system presents the synthetic images as the final images generated by the GAN (operation 612).

Exemplary Computer System and Apparatus

Figure 7:
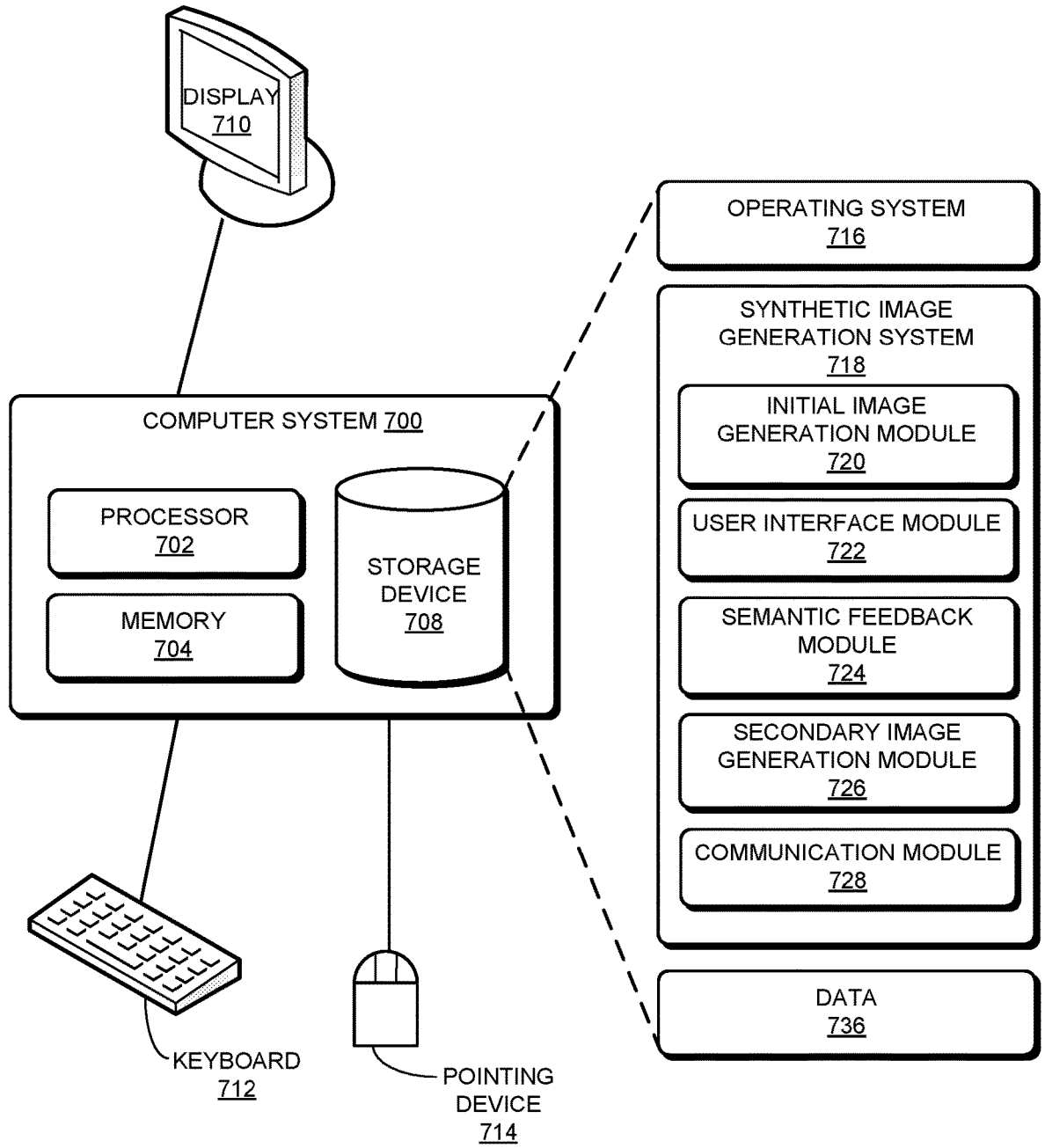
FIG. 7 illustrates an exemplary computer system that facilitates synthetic image generation based on semantic information, in accordance with an embodiment of the present application.

FIG. 7 illustrates an exemplary computer system that facilitates synthetic image generation based on semantic information, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a synthetic image generation system 718, and data 736. Synthetic image generation system 718 can incorporate the operations of one or more of: initial GAN 112, semantic analysis module 114, and secondary GAN 116.

Synthetic image generation system 718 can include instructions, which when executed by computer system 700 can cause computer system 700 to perform methods and/or processes described in this disclosure. Specifically, synthetic image generation system 718 can include instructions for generating intermediate synthetic images (initial image generation module 720). Synthetic image generation system 718 can also include instructions for operating a specialized user interface that allows a user to provide semantic feedback for the intermediate synthetic images (user interface module 722). Furthermore, synthetic image generation system 718 includes instructions for obtaining semantic feedback (e.g., weights allocated for image units) via the user interface (semantic feedback module 724).

In addition, synthetic image generation system 718 includes instructions for automatically generating semantic feedback for the intermediate synthetic images (semantic feedback module 724). Synthetic image generation system 718 can also include instructions for generating final synthetic images (secondary image generation module 726). Synthetic image generation system 718 may further include instructions for sending and receiving messages (communication module 728). Data 736 can include any data that can facilitate the operations of one or more of: initial GAN 112, semantic analysis module 114, and secondary GAN 116. Data 736 may include one or more of: real image samples, noise vectors, intermediate synthetic images, grid granularity information, weight allocated for respective grid elements and corresponding spatial weight masks, spatial probability maps, and final synthetic images.

Figure 8:
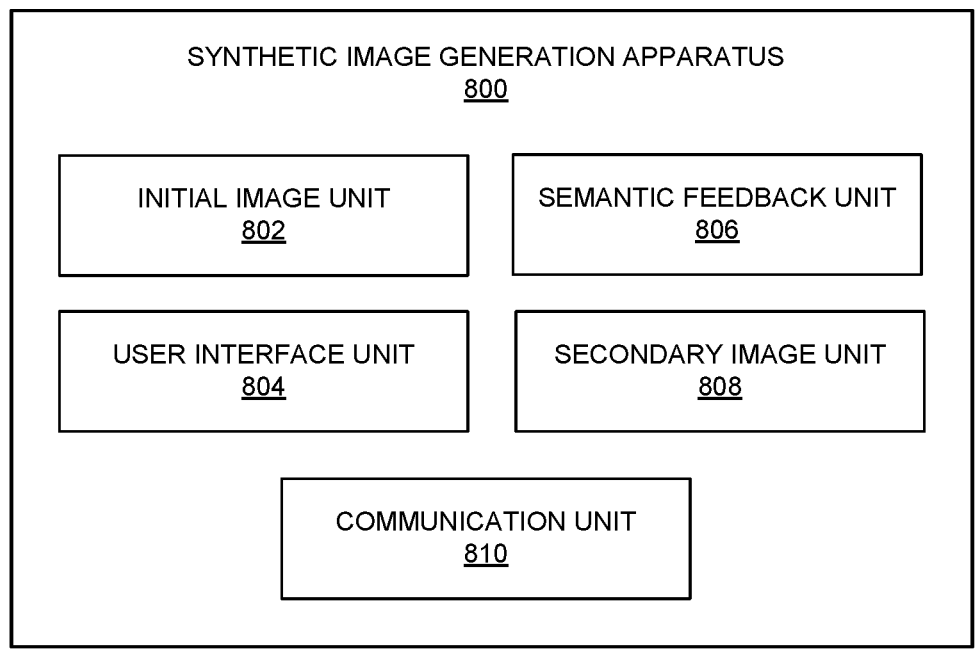
FIG. 8 illustrates an exemplary apparatus that facilitates synthetic image generation based on semantic information, in accordance with an embodiment of the present application.

FIG. 8 illustrates an exemplary apparatus that facilitates synthetic image generation based on semantic information, in accordance with an embodiment of the present application. Synthetic image generation apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-810, which perform functions or operations similar to modules 720-728 of computer system 700 of FIG. 7, including: an initial image unit 802; a user interface unit 804; a semantic feedback unit 806; a secondary image unit 808; and a communication unit 810.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for generating semantically accurate synthetic images, comprising:
   generating a first synthetic image using a first artificial intelligence (AI) model;
   presenting the first synthetic image in a user interface, wherein the user interface is configured to receive information indicating image units of the first synthetic image that are semantically irregular;
   obtaining semantic information for the semantically irregular image units from a user via the user interface;
   incorporating the semantic information into a second AI model; and
   generating a second synthetic image using the second AI model, wherein the second synthetic image is generated when a metric is within a threshold and includes one or more improved image units compared to the first synthetic image.

2. The method of claim 1, further comprising:
   obtaining a selection of a highlighting tool for the user interface, wherein a region marked by the highlighting tool is selectable via the user interface, and wherein the highlighting tool corresponds to one of: a grid-based selector, a polygon-based selector, and a freehand selector; and
   in response to the highlighting tool being the grid-based selector, setting the highlighting tool at an obtained granularity.

3. The method of claim 2, further comprising:
   obtaining a selection of a region selected by the highlighting tool in the user interface; and
   obtaining a weight allocated for the region.

4. The method of claim 1, wherein the first and second AI models are generative adversarial networks (GANs).

5. The method of claim 1, wherein the second AI model includes a discriminator that outputs a spatial probability map, wherein a respective element of the spatial probability map indicates the probability of an image unit of the second synthetic image being realistic.

6. The method of claim 5, wherein the second AI model includes a generator that outputs the second synthetic image in such a way that corresponding image units, which include the one or more improved image units, are different than the semantically irregular image units of the first synthetic image.

7. The method of claim 6, further comprising generating a spatial weight mask based on the obtained semantic information, wherein the spatial weight mask comprises weights allocated to a respective image unit of the first synthetic image, and wherein the generator and the discriminator determine the semantically irregular image units based on the spatial weight mask.

8. The method of claim 1, wherein an image unit corresponds to one or more of: a pixel, a pixel block, and a group of pixels of an irregular shape.

9. The method of claim 1, wherein generating the first and the second synthetic images includes mapping a noise vector into a synthetic image sample.

10. The method of claim 1, further comprising:
generating a third synthetic image using the first AI model;
automatically obtaining semantic information for semantically irregular image units of the third synthetic image based on an irregularity detection technique; and
generating a fourth synthetic image using the second AI model based on the automatically obtained semantic information.

11. A non-transitory computer-readable storage medium storing instructions that when executed by a computer cause the computer to perform a method for generating semantically accurate synthetic images, the method comprising:
generating a first synthetic image using a first artificial intelligence (AI) model;
presenting the first synthetic image in a user interface, wherein the user interface is configured to receive information indicating image units of the first synthetic image that are semantically irregular;
obtaining semantic information for the semantically irregular image units from a user via the user interface;
incorporating the semantic information into a second AI model; and
generating a second synthetic image using the second AI model, wherein the second synthetic image is generated when a metric is within a threshold and includes one or more improved image units compared to the first synthetic image.

12. The non-transitory computer-readable storage medium of claim 11, wherein the method further comprises:
obtaining a selection of a highlighting tool for the user interface, wherein a region marked by the highlighting tool is selectable via the user interface, and wherein the highlighting tool corresponds to one of: a grid-based selector, a polygon-based selector, and a freehand selector; and
in response to the highlighting tool being the grid-based selector, setting the highlighting tool at an obtained granularity.

13. The non-transitory computer-readable storage medium of claim 12, wherein the method further comprises:
obtaining a selection of a region selected by the highlighting tool in the user interface; and
obtaining a weight allocated for the region.

14. The non-transitory computer-readable storage medium of claim 11, wherein the first and second AI models are generative adversarial networks (GANs).

15. The non-transitory computer-readable storage medium of claim 11, wherein the second AI model includes a discriminator that outputs a spatial probability map, wherein a respective element of the spatial probability map indicates the probability of an image unit of the second synthetic image being realistic.

16. The non-transitory computer-readable storage medium of claim 15, wherein the second AI model includes a generator that outputs the second synthetic image in such a way that corresponding image units, which include the one or more improved image units, are different than the semantically irregular image units of the first synthetic image.

17. The non-transitory computer-readable storage medium of claim 16, wherein the method further comprises generating a spatial weight mask based on the obtained semantic information, wherein the spatial weight mask comprises weights allocated to a respective image unit of the first synthetic image, and wherein the generator and the discriminator determine the semantically irregular image units based on the spatial weight mask.

18. The non-transitory computer-readable storage medium of claim 11, wherein an image unit corresponds to one or more of: a pixel, a pixel block, and a group of pixels of an irregular shape.

19. The non-transitory computer-readable storage medium of claim 11, wherein generating the first and the second synthetic images includes mapping a noise vector into a synthetic image sample.

20. The non-transitory computer-readable storage medium of claim 11, wherein the method further comprises:
generating a third synthetic image using the first AI model;
automatically obtaining semantic information for semantically irregular image units of the third synthetic image based on an irregularity detection technique; and
generating a fourth synthetic image using the second AI model based on the automatically obtained semantic information.

* * * * *